Patented Oct. 14, 1941

2,258,978

UNITED STATES PATENT OFFICE 2,258,978

AZO COMPOUNDS AND MATERIAL COLORED THEREWITH

Joseph B. Dickey and Max M. Levine, Rochester, N. Y., assignors to Eastman Kodak Company, Rochester, N. Y., a corporation of New Jersey No Drawing. Application April 27, 1940, Serial No. 332,040

4 Claims. (Cl. 260—205)

This invention relates to new azo dye compounds and their application to the art of coloration. We have discovered that the azo dye compounds having the general formula:

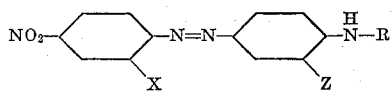

wherein X represents a member selected from the group consisting of hydrogen and halogen, Z represents a member selected from the group consisting of methyl and methoxy and R represents a member selected from the group consisting of β-hydroxyethyl, monohydroxypropyl and glyceryl constitute a very valuable class of dye compounds. The halogen atom represented by X may be chlorine, bromine, fluorine or iodine. Ordinarily when X is a halogen atom it is chlorine.

The azo dye compounds of our invention have been found to be of particular value for the dyeing of organic derivatives of cellulose especially cellulose acetate silk and by means of them these materials, particularly textile material made of cellulose acetate silk, can be dyed orange or red shades of very excellent fastness to light and washing. Further, the azo dye compounds of our invention possess excellent affinity for cellulose acetate silk and dye this material rapidly even at temperatures as low as 60-65° C. This advantage is of real importance, for example, in jig dyeing operations and results in lowered dyeing costs since less heat is required in the dyeing operation. Another advantage possessed by the dye compounds of our invention is that deep dyeings can be obtained with as little as 1% pure dye (by weight on the cloth).

The dye compounds of our invention likewise find application for use in mixtures of dyes particularly in mixtures yielding brown and black dyeings. In order that the colors yielded by the dye compounds may be clear it is here noted that those compounds wherein X is hydrogen and Z is methyl yield reddish-orange colorations while those wherein X is halogen and Z is methyl yield brick-red colorations. Similarly the dye compounds wherein X is hydrogen and Z is methoxy yield orange-red colorations with a bluish tint while those wherein X is halogen and Z is methoxy yield rubine colorations.

Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose. While the dye compounds of our invention will be described more particularly with reference to their application for the coloration of cellulose acetate silk, it will be understood that they can be employed for the coloration of organic derivatives of cellulose generally such as those just named.

The azo dye compounds of our invention can be prepared by diazotizing an amine having the general formula:

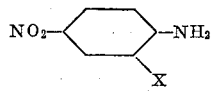

wherein X is hydrogen or halogen and coupling the diazonium compounds obtained with a compound having the general formula:

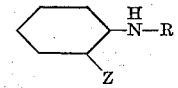

wherein R represents β-hydroxyethyl, monohydroxypropyl or glyceryl and Z represents a methyl or methoxy group.

The following examples illustrate the preparation of the azo dye compounds of our invention:

Example 1

13.8 grams of p-nitroaniline are diazotized in known fashion and the diazonium compound obtained is added slowly with stirring to a cold dilute hydrochloric acid solution of 16.7 grams of β-hydroxyethyl-o-anisidine. The coupling reaction which takes place is completed by adding a base such as sodium carbonate or sodium acetate until the reaction mixture is neutral to Congo red paper. The dye compound formed is recovered by filtration, washed with water and dried. The dye compound obtained has the formula:

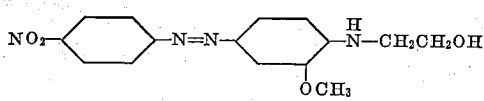

and colors cellulose acetate silk an orange-red shade.

Example 2

13.8 grams of p-nitroaniline are diazotized in known fashion and the diazonium compound obtained is added slowly with stirring to a cold dilute hydrochloric acid solution of 17.1 grams of β-hydroxyethyl-o-toluidine. The coupling reaction which takes place is completed by the addition of sodium carbonate until the reaction mixture is neutral to Congo red paper. The dye compound formed is recovered by filtration, washed with water and dried. The dye compound obtained has the formula:

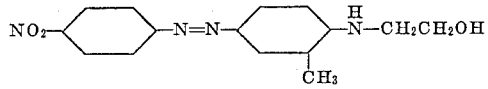

and colors cellulose acetate silk a reddish-orange shade.

*Example 3*

16.2 grams of 1-amino-2-chloro-4-nitrobenzene are diazotized in known fashion and the diazonium compound obtained is coupled with an equivalent gram molecular weight of mono-β-hydroxylpropyl-o-toluidine. Coupling and recovery of the dye compound can be carried out as described in Example 1. The dye compound obtained colors cellulose acetate silk a brick-red shade.

*Example 4*

13.8 grams of p-nitroaniline are diazotized in known fashion and the diazonium compound obtained is coupled with an equivalent gram molecular weight of monoglyceryl-o-toluidine. Coupling and recovery of the dye compound formed can be carried out as described in Example 1. The dye compound obtained has the formula:

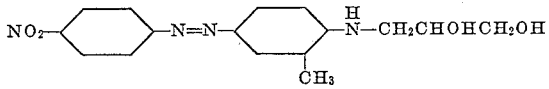

and colors cellulose acetate silk a reddish-orange color.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 4, inclusive.

or solubilizing agent and adding the resulting mixture to water or a dilute solution of soap and water to form an aqueous dyebath. Following this known preparation of the dyebath, the textile material, for example, to be dyed may be added to the dyebath and the dyeing operation conducted in known fashion. For a more complete description as to how the azo dye compounds of our invention may be employed in coloring operations, reference may be had to McNally and Dickey U. S. Letters Patent No. 2,115,030, issued April 26, 1938, wherein the coloration of organic derivatives of cellulose textile materials and more particularly cellulose acetate silk textile materials is described. It will be understood, however, that with the dye compounds of the present invention colorations of excellent fastness to light and washing can be obtained with smaller concentrations of dye than specifically indicated in said Letters Patent. Again, the dyeing operation may be conducted at a somewhat lower temperature than that indicated, for example, a temperature of 60-65° C. although the temperature specifically set forth in said Letters Patent can be employed if desired. It will be understood that coloration can be effected by dyeing, printing, stenciling or like methods.

We claim:

1. The azo dye compounds having the general formula:

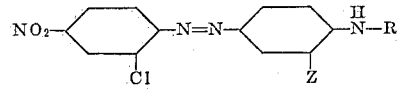

wherein Z represents a member selected from the group consisting of methyl and methoxy and R represents a member selected from the group consisting of β-hydroxyethyl, monohydroxypropyl and glyceryl.

2. The azo dye compounds having the general formula:

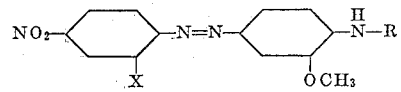

wherein X represents a member selected from the group consisting of hydrogen and halogen and R repersents a member selected from the group consisting of β-hydroxyethyl, monohydroxypropyl and glyceryl.

3. An organic derivative of cellulose colored

| Amine | Coupling component | Color |
| --- | --- | --- |
| p-Nitroaniline | Mono-β-hydroxypropyl-o-toluidine | Reddish-orange. |
| Do | Mono-β-hydroxypropyl-o-anisidine | Orange-red. |
| 1-amino-2-chloro-4-nitro-benzene | β-Hydroxyethyl-o-toluidine | Brick-red. |
| Do | Monoglyceryl-o-toluidine | Do. |
| Do | Monoglyceryl-o-anisidine | Rubine. |
| Do | Mono-β-hydroxypropyl-o-anisidine | Do. |
| 1-amino-2-iodo-4-nitrobenzene | β-Hydroxyethyl-o-toluidine | Brick-red. |
| Do | Mono-β-hydroxypropyl-o-anisidine | Rubine. |
| Do | Monoglyceryl-o-anisidine | Do. |
| 1-amino-2-bromo-4-nitrobenzene | β-Hydroxyethyl-o-toluidine | Brick-red. |
| Do | Mono-β-hydroxypropyl-o-anisidine | Rubine. |
| Do | β-Hydroxyethyl-o-anisidine | Do. |
| 1-amino-2-fluoro-4-nitrobenzene | β-Hydroxyethyl-o-toluidine | Brick-red. |
| Do | Monoglyceryl-o-toluidine | Do. |
| Do | Mono-β-hydroxypropyl-o-anisidine | Rubine. |
| p-Nitroaniline | Mono-γ-hydroxypropyl-o-toluidine | Reddish-orange. |
| 1-amino-2-chloro-4-nitrobenzene | do | Brick-red. |
| p-Nitroaniline | Mono-γ-hydroxypropyl-o-anisidine | Orange-red. |
| 1-amino-2-chloro-4-nitrobenzene | do | Rubine. |

The azo dye compounds of our invention are relatively insoluble in water. They may be employed for the direct dyeing of organic derivatives of cellulose particularly textile materials made of such materials by grinding to a fine powder, intimately mixing with a suitable dispersing with an azo dye compound having the general formula:

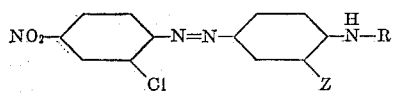

wherein Z represents a member selected from the group consisting of methyl and methoxy and R represents a member selected from the group consisting of β-hydroxyethyl, monohydroxypropyl and glyceryl.

4. A cellulose acetate colored with an azo dye compound having the general formula:

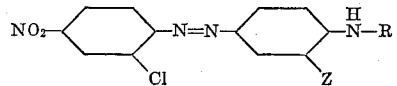

wherein Z represents a member selected from the group consisting of methyl and methoxy and R represents a member selected from the group consisting of β-hydroxyethyl, monohydroxypropyl and glyceryl.

JOSEPH B. DICKEY.
MAX M. LEVINE.